United States Patent [19]
Fink et al.

[11] 3,761,751
[45] Sept. 25, 1973

[54] MOUNTING ARRANGEMENT FOR WHEEL SPEED SENSORS

[75] Inventors: Werner Fink; Dieter Kircher, both of Frankfurt; Reinhard Rauschenbach, Langen-Oberlinden, all of Germany

[73] Assignee: ITT Industries, Inc., New York, N.Y.

[22] Filed: Jan. 26, 1972

[21] Appl. No.: 220,805

[30] Foreign Application Priority Data
Mar. 19, 1971 Germany................... P 21 13 307.3

[52] U.S. Cl............................... 310/168, 310/67
[51] Int. Cl............................................. H02k 19/20
[58] Field of Search.................. 310/168, 169, 170, 310/67, 90, 181, 91

[56] References Cited
UNITED STATES PATENTS

| | | | |
|---|---|---|---|
| 3,500,091 | 3/1970 | Jones | 310/168 |
| 3,515,920 | 6/1970 | Jones | 310/168 |
| 3,629,635 | 12/1971 | Pauwels | 310/168 |
| 3,626,225 | 12/1971 | Pauwels | 310/168 |
| 3,515,921 | 6/1970 | DeLange | 310/168 |
| 3,482,129 | 12/1969 | Riordan | 310/168 |
| 3,541,368 | 11/1970 | Jones | 310/168 |

Primary Examiner—R. Skudy
Attorney—C. Cornell Remsen, Jr. et al.

[57] ABSTRACT

A fixing flange for a speed sensor enables the scanning head to be easily mounted with respect to a tooth disc, said tooth disc being mounted on the wheel hub to provide a unitary structure and the fixing flange is secured to the axle or the kingpin to provide a unitary structure. In one embodiment, the air gap between the magnetic pole pieces carried by the sensor and the outer periphery of the tooth disc is determined by the radius of the toothed disc and the radius of the magnetic pole pieces, the outer periphery of the toothed disc and the outer periphery of the fixing flange being coaxial with respect to the axis of the axle, the sensor being secured to the outer periphery of the fixing flange. In another embodiment, the magnetic pole pieces are covered with a plastic layer having a thickness equal to the desired air gap between the toothed disc and magnetic pole pieces of the sensor. The sensor is mounted to the fixing flange so that the sensor extends therethrough and the plastic layer is in contact with the outer periphery of the toothed disc. During the first rotation, the toothed disc will scrape the plastic layer off of the magnetic pole pieces thereby ensuring the desired air gap.

8 Claims, 10 Drawing Figures

MOUNTING ARRANGEMENT FOR WHEEL SPEED SENSORS

BACKGROUND OF THE INVENTION

The invention refers to a wheel speed sensor and more particularly to a mounting arrangement for the wheel speed sensor, a toothed disc rotating with a body revolving around a wheel axle inducing a pulse sequence in a magnetic pole piece disposed adjacent the outer periphery of the toothed disc.

Sensors are known which determine without friction contacts, i.e., by means of inductors or capacitors, the state of motion of rotating parts, e.g., of motor vehicle wheels in anti-skid systems, and which supplies an electrical signal proportional to the rotating speed of the rotating part.

It is often desirable to provide the rotating part itself with teeth or, if this is not possible or technically unfavorable, to have a toothed disc revolve with the rotating part and to induce a pulse sequence in the magnetic pole piece of a fixed sensor, the frequency of the thusly generated pulse sequence being proportional to the instantaneous rotary speed.

The exact installation and adjustment of the sensor up to now is still subject to difficulties. Since the trigger for the production of the square-wave voltage desired for the further processing makes high demands on the input signals, the air gap between the teeth and the magnetic pole pieces of the sensor must lie within the narrowest tolerances possible, that is, the magnitude of the air gap should not vary. In order to obtain this, up to now, a lateral guide is provided among others for the installation and fixing of the sensor, the sensor then being screwed laterally to said lateral guide. When installed, the air gap is then adjusted manually by means of a feeler gauge. This is a very difficult and above all time-consuming procedure, the occurring tolerances still lying between 1/10 and 1 mm (millimeter).

SUMMARY OF THE INVENTION

An object of the present invention is to provide a mounting arrangement for a wheel speed sensors relation to rotating teeth that simplify the installation of the sensor and the adjustment of the air gap as well as decreasing the air gap tolerances.

A feature of the present invention is the provision of a mounting arrangement for wheel speed sensors comprising: a wheel axle having a given longitudinal axis; a kingpin disposed about the axle coaxial with the given axis; a wheel hub disposed about the kingpin coaxial with the given axis; a toothed disc secured to the wheel hub, the toothed disc having an outer periphery coaxial with the given axis; a fixing flange secured to one of the axle and the kingpin; and a sensor having at least one magnetic pole piece extending axially therefrom the sensor being secured to the fixing flange to dispose the magnetic pole piece in spaced relation to the outer periphery of the toothed disc to provide a desired air gap between the outer periphery of the toothed disc and the magnetic pole piece having a minimum variation as the toothed disc rotates relative to the magnetic pole pieces.

Another feature of the present invention is to position the sensor relative of the axis of a fixed wheel axle or relative to the outer periphery of the toothed disc.

Still another feature of the present invention the sensor is secured on a fixing flange which is secured to the axle or the kingpin to provide a unitary structure.

A further feature of the present invention is to provide projections, which enlarge the isolated fixing surface of the scanning head, from both sides of the scanning head set off step-like at the sensor body, said scanning head carrying the magnetic pole pieces. The bottom side of the scanning head as well as the bottom side of the projections is of a circular-arc shape which have a radius equal to the radius of the fixing flange.

Still a further feature of the present invention is to secure the sensor to the circumferential surface or outer periphery of the fixing flange by means of screws or bolts threaded into mating bores provided in the projections and the outer periphery of the fixing flange.

Still another feature of the present invention is to secure the sensor to the outer periphery of the fixing flange by clamping springs which engage bores inside of the fixing flange and are disposed over the projections so that the spring loop portion of the clamping springs provide a clamping effect.

A further feature of the present invention is that the centers of the radii of the toothed disc, of the curved scanning head, of the fixing flange, and of the wheel hub lie on a common axis.

Still a further feature of the present invention is that the sensor has vertical projections at the step between scanning head and sensor housing and is held in a guide pointing vertically to the axle. The vertical projections are then capable of being bolted to the guide, the guide gap of said guide corresponding to the breadth of the scanning head. Before installation a plastic layer is deposited on the circularly arcuate bottom side of the scanning head or magnetic pole piece, the thickness of said plastic layer exactly equalling the required air gap between the pole pieces of the scanning head and the teeth (outer periphery) of the toothed disc. When installed, the scanning head of the sensor, the sensor capable of being shifted vertically in the guide, is disposed with the plastic layer on the gear rim (outer periphery) of the toothed disc, and the sensor is bolted to the guide by bolts guided through the bores or elongated holes in the vertical projections. The plastic layer is scraped off by the first revolution of the toothed disc.

BRIEF DESCRIPTION OF THE DRAWINGS

Above-mentioned and other features and objects of this invention will become more apparent by reference to the following description taken in conjunction with the accompanying drawing in which:

FIG. 2b illustrates a cross-sectional view taken along line 2b—2b of FIG. 2a;

DESCRIPTION OF THE PREFERRED EMBODIMENTS

Figure 1:
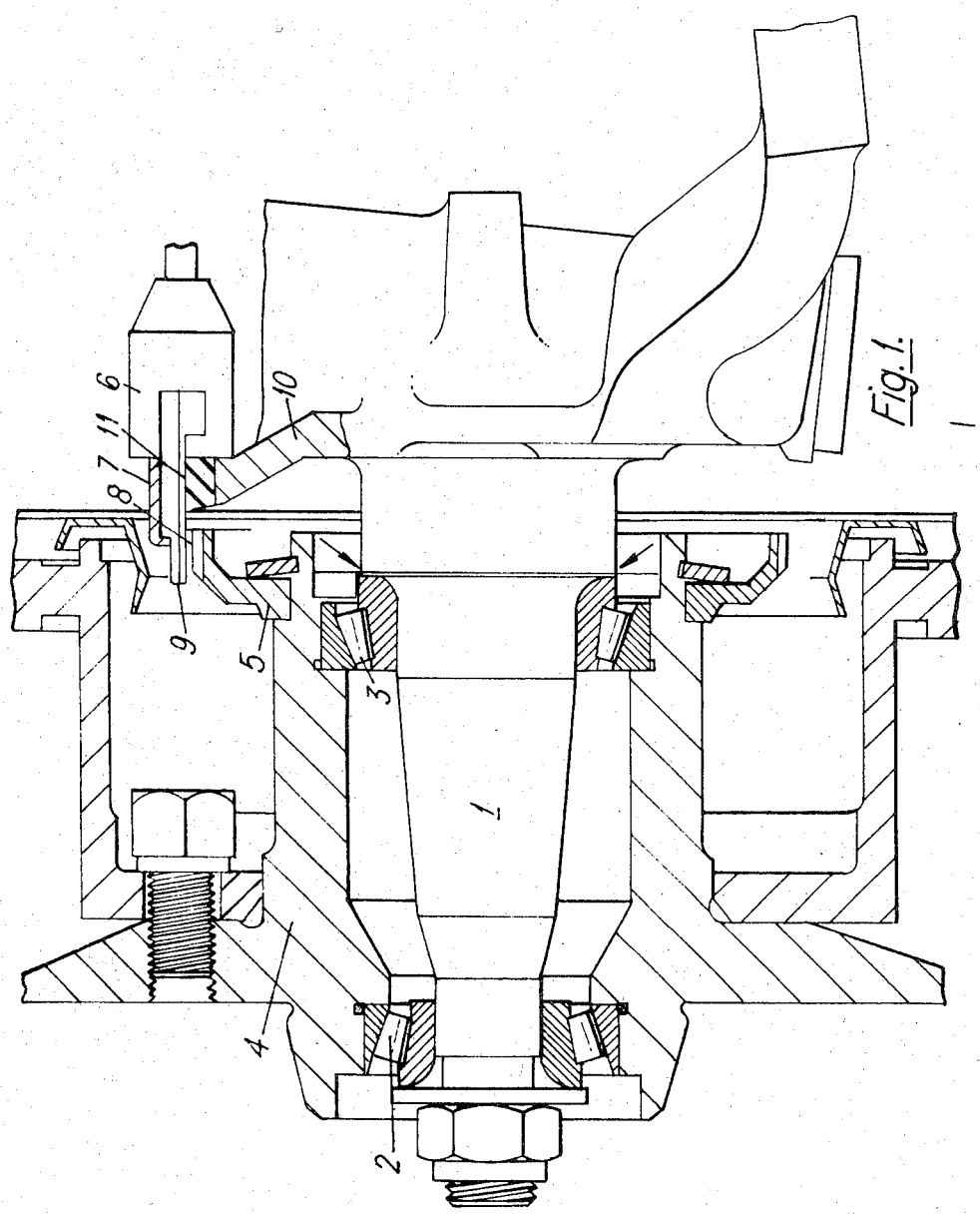
FIG. 1 illustrates a cross-sectional view partially in elevation of one embodiment of a mounting arrangement for a wheel speed sensor in accordance with the principles of the present invention.

FIG. 1 illustrates kingpin 1 on which the wheel hub 4 is supported with other rotating parts of the vehicle wheel by tapered-roller bearings 2 and 3. Toothed disc 5 is also fixed to the wheel hub 4 on an internal part, said wheel hub 4 carrying toothed disc 5 cooperating with sensor 6 to produce an electrical signal proportional to the rotative speed of the wheel. Toothed disc 5 is connected with the wheel hub 4 in a manner which is known per se to provide a unitary structure such that a centering or positioning of sensor 6 can be made in respect to kingpin 1, or more properly the axis of the wheel axle. Sensor 6 scanning the rotary movement of toothed disc 5 and, thus, that of the vehicle wheel is fixed to the kingpin 1 in a way that pole shoes 8, contained in scanning head 7 which is set off step-like from the rest of the body of the sensor 6, lie a predetermined distance above the toothed circumferential surface or outer periphery of toothed disc 5. Thus, the air gap 9 is predetermined which is also a decisive component for the induction of the electric pulses. For this purpose in traditional designs an additional component, such as a fixing or centering flange, is arranged on kingpin 1 to which the sensor is fixed by the known means. Even this fixing or centering flange, or even a sleeve sled onto the kingpin 1 for the same purpose, must be centered exactly when mounted with respect to kingpin 1 (axle axis), and sensor 6 must be arranged with the utmost accuracy in order to avoid tolerances or gap variations in air gap 9 during the rotation, said tolerances falsifying the measured value, and to keep air gap 9 as constant as possible.

According to the invention, as can be seen from FIG. 1, fixing flange 10 for sensor 6 is built in one body or unitary structure with kingpin 1 when manufactured so that centering of flange 10 becomes superfluous when it is installed. The mounting thus becomes considerably more simple and time-saving, and a source of defect in the accuracy of measurement of sensor 6 is eliminated.

Magnetic pole pieces 8 are inserted in the isolating material disposed in the front half of the scanning head 7 such that the bottom side of pole pieces 8 are disposed opposite to the periphery of toothed disc 5 when sensor 6 is mounted. Thus, pole pieces 8 face in an unisolated state the toothed disc 5 separated by the distance of air gap 9 such that on passing the teeth a pulse sequence is induced in pole pieces 8 having a frequency proportional to the rotary speed of the wheel.

An electrically isolated fixing surface 11 is provided in the second half of the bottom side of scanning head 7 subsequent to pole pieces 8. By means of fixing surface 11 sensor 6 is supported on the circumferential surface or periphery of the fixing or centering flange 10.

The inventive embodiment of the exact arrangement of how sensor 6 is secured to fixing flange 10 can be seen from FIGS. 2a to 2d.

Figure 2A:
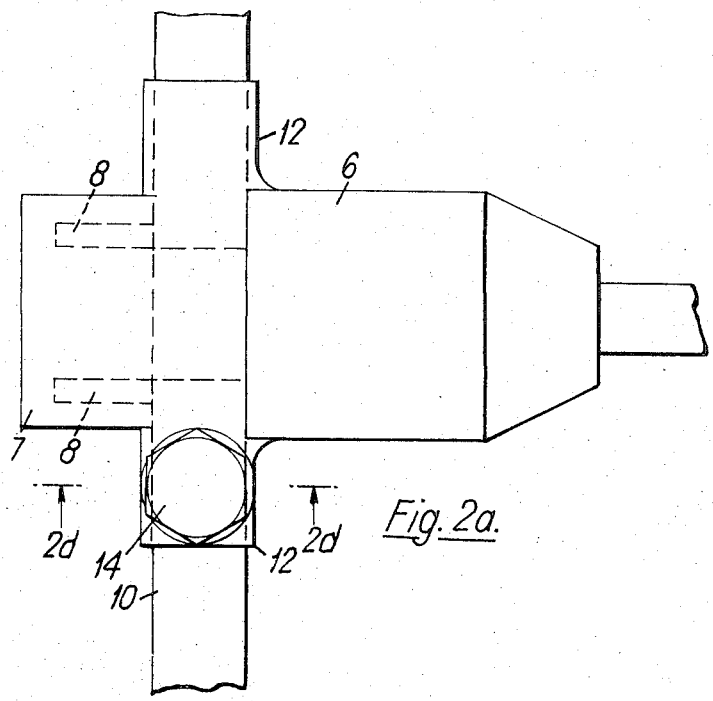
FIG. 2a illustrates a side elevational view partially in cross-section of the wheel speed sensor of FIG. 1.
Figure 2B:
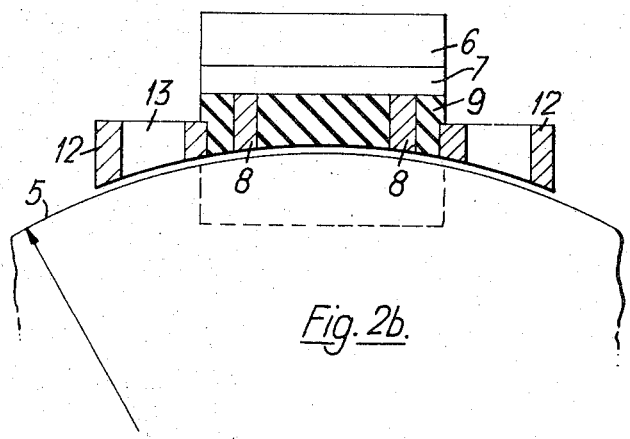
Figure 2C:
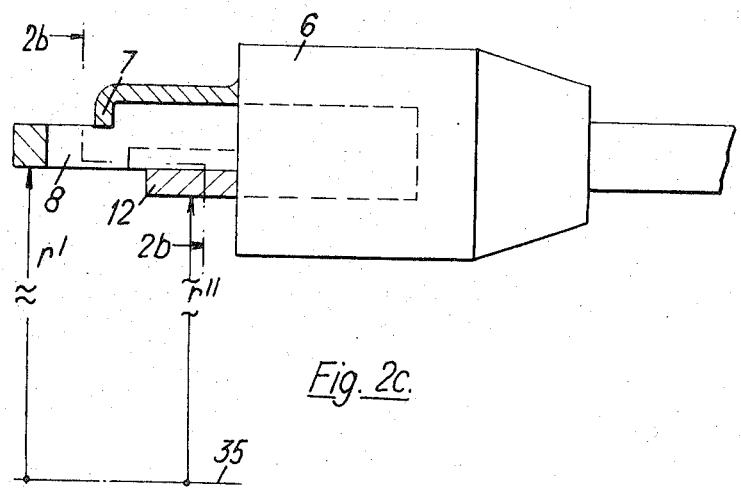
FIG. 2c illustrates a top plan view of the wheel speed sensor of FIG. 1.
Figure 2D:
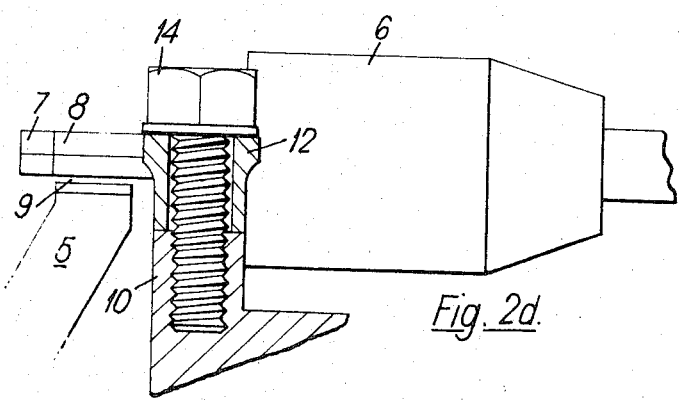
FIG. 2d illustrates a cross-sectional view taken along line 2d—2d of FIG. 2c.

FIG. 2a shows the sensor 6 mounted on the fixing flange 10 in plan view.

Projections 12 extending in the direction of the periphery of fixing flange 10 are arranged laterally at scanning head 7 in the range of fixing surface 11, the fixing surface 11 being enlarged by projections 12. The bottom side of scanning head 7 including the projections 12 facing the toothed disc 5 and the circumferential surface or periphery of fixing flange 10 is circular-arc-shaped as can be seen from FIG. 2b. The centers of the radii $r$ of toothed disc 5 (FIG. 2b), $r'$ of the pole piece surface (FIG. 2c), $r''$ of the fixing surface at scanning head 7 (FIG. 2c), and of fixing flange 10 all lie on the axis 35 of the vehicle wheel or kingpin 1. Bores 13 are provided in projections 12 by which sensor 6 can be mounted exactly on the periphery of fixing flange 10 by means of bolts 14.

FIG. 2d again illustrates the securing of sensor 6 by projections 12 on fixing flange 10 by means of bolts 14.

Figure 3A:
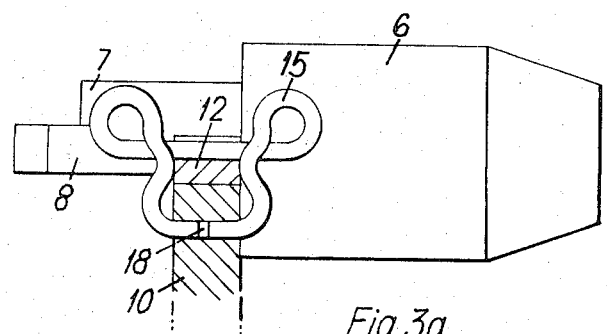
FIGS. 3a, 3b and 3c illustrate a side elevational view partially in cross-section of three different embodiments of fastening the wheel speed sensor to the fixing flange of FIG. 1.
Figure 3B:
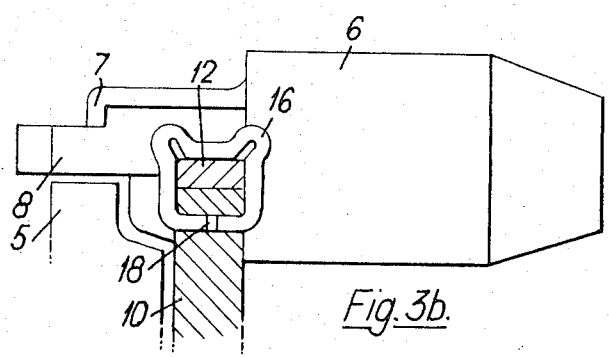
Figure 3C:
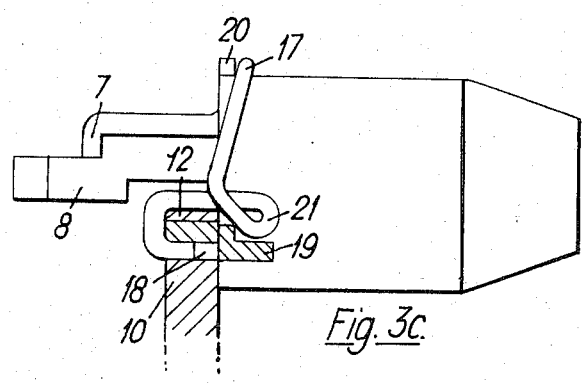

FIG. 3a to 3c illustrate three examples of securing sensor 6 on fixing flange 10 by means of clamping springs 15, 16 and 17.

Subsequently to the fixing surface of scanning head 7 lateral projections 12 are also provided in these embodiments of the invention. Here also the arc of the whole fixing surface follows exactly the circumferential surface or periphery of fixing flange 10 which was built in one body or unitary structure with kingpin 1 during its manufacture. Fixing flange 10 has a longitudinal bore 18 beneath each of the projections 12. In the FIGS. 3a and 3b, a clamping spring 15 and 16 each engages longitudinal bore 18 bilaterally with its ends and is guided with its center part or spring loop portion over projection 12 at scanning head 7 of sensor 6. In order to reach the required clamping effect the clamping spring is bent into a loop in different manners laterally to projections 12 in FIGS. 3a and 3b.

In FIG. 3c projections 19 and 20 are arranged at sensor 6 before the step to scanning head 7, projection 19 forming an angle. Clamping spring 17 here engages longitudinal bore 18 of fixing flange 10 with one end only, is then guided over projection 12, or through a longitudinal bore in projection 12, then bent into a loop 21 in order to reach the clamping effect, said loop 21 resting on angular projection 19 of sensor 6, and the other end of spring 17 engages projection 20.

Figure 4A:
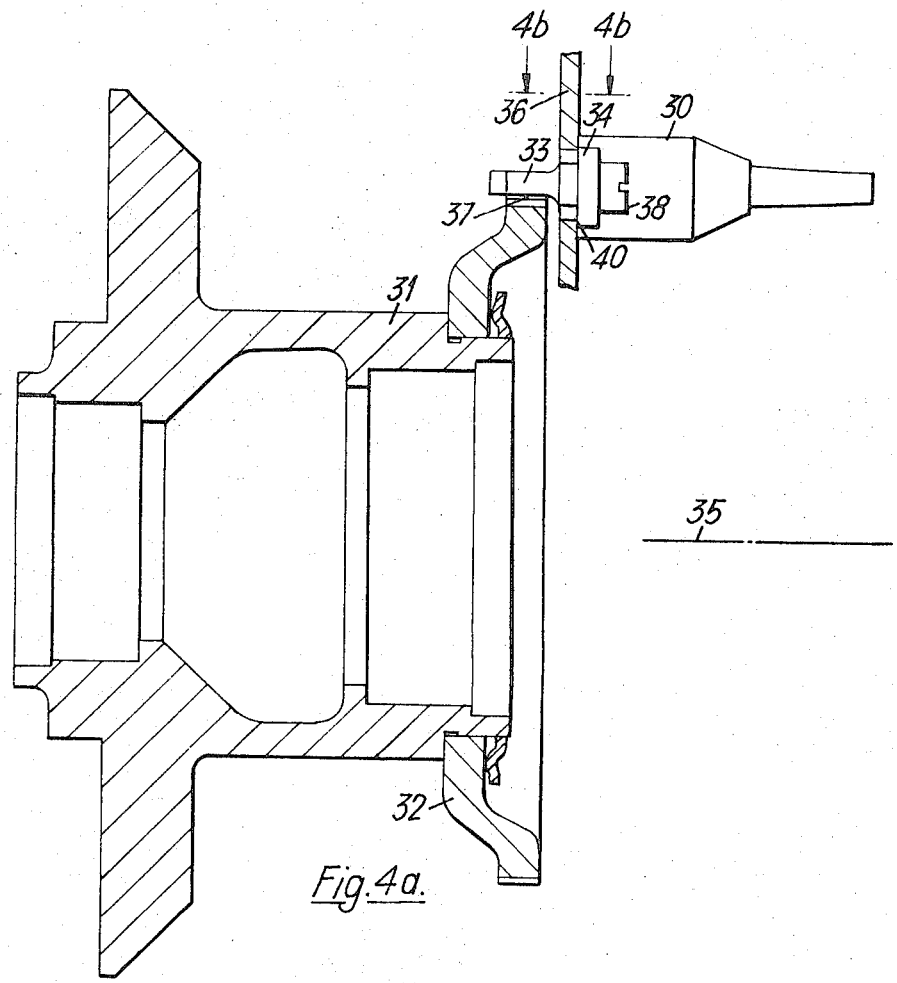
FIG. 4a illustrates a cross-sectional view partially in elevation of another embodiment of a mounting arrangement for a wheel speed sensor in accordance with the principles of the present invention.
Figure 4B:
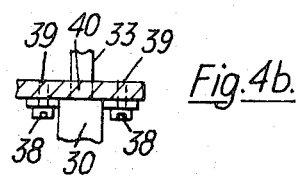
FIG. 4b illustrates a cross-sectional view taken along lines 4b—4b.

FIGS. 4a and 4b illustrate another embodiment for the simplification of the exact installation of sensor 30. Toothed disc 32 is again arranged on wheel hub 31 so that the outer periphery of disc 32 is coaxial of axis 35. Scanning head 33, in which the pole pieces are insolatedly inserted, is also set off step-like from the rest of the housing of sensor 30. Projections 34 are provided at the step of sensor 30, said projections 34 having a bore or an elongated hole therethrough. Pointing vertically to the axis 35 of the wheel a fixed guide 36 for sensor 30 is provided. Guide 36 is fixed to a fixed structure associated with a wheel such as the wheel axle or kingpin. The longitudinal vertical aperture 40 of guide 36 corresponds in its breadth to the breadth of scanning head 33. Threaded bores 39 are provided at both sides of the longitudinal vertical aperture in the part of guide 36 where sensor 30 is to be installed. The bottom side of scanning head 33 is again circular-arc-shaped corresponding to the circumferential surface or periphery of toothed disc 32 and carries pole pieces which face unisolatedly the teeth or periphery toothed disc 32.

Plastic layer 37 is deposited on the pole pieces before installation, i.e., on the bottom side of the scanning head, the thickness of plastic layer 37 corresponding exactly to the required air gap between the pole pieces in the scanning head 33 and the teeth or periphery of toothed disc 32. When installed, sensor 30 is shifted downwards in the longitudinal vertical aperture 40 of guide 36 until scanning head 33 is supported fixedly on the gear or teeth rim or periphery of toothed disc 32 by the intervening plastic layer 37. By means of bolts 38, which are guided with play through the bores or apertures of projections 34, or through their elongated hole, sensor 30 is bolted in place on guide 36 by threaded bores 39 carried by guide 36. Sensor 30 rests against guide 36 with the step between the housing of sensor 30 and scanning head 33. With the first revolution of the wheel the teeth of co-rotating toothed disc 32 scrape plastic layer 37 off of the pole pieces in the scanning head 33, and the required air gap is exactly produced.

The invention decreases substantially the air gap tolerances (air gap variations) together with a considerable simplification of the installation work required. At the moment an 11/100 mm air gap is achieved as compared with air gap of 1/10 – 1 mm achieved by the old manner of installation. The installation can be effected in substantially shorter time as only the toothed disc has to be centered with respect to the kingpin, and an adjustment of the air gap by means of a feeler gauge becomes superfluous.

While we have described above the principles of our invention in connection with specific apparatus it is to be more clearly understood that this description is made only by way of example and not as a limitation to the scope of our invention as set forth in the objects thereof and in the accompanying claims.

We claim:

1. A mounting arrangement for wheel speed sensors comprising:
   a wheel axle having a given longitudinal axis;
   a kingpin disposed about said axle coaxial with said given axis;
   a wheel hub disposed about said kingpin coaxial with said given axis;
   a toothed disc secured to said wheel hub for rotating therewith, said toothed disc having an outer periphery coaxial with said given axis;
   a non-rotating fixing flange secured to one of said axle and said kingpin; and
   a sensor having at least one magnetic pole piece extending axially therefrom, said sensor being secured to said fixing flange to dispose said magnetic pole piece a greater distance from said given axis than the outer periphery of said toothed disc and in spaced relation to the outer periphery of said toothed disc to provide a desired air gap between the outer periphery of said toothed disc and said magnetic pole piece, said air gap having a minimum variation as said toothed disc rotates relative to said magnetic pole pieces,
   said toothed disc and said wheel hub being constructed as a unitary structure.

2. A mounting arrangement for wheel speed sensors comprising:
   a wheel axis having a given longitudinal axis;
   a kingpin disposed about said axle coaxial with said given axis;
   a wheel hub disposed about said kingpin coaxial with said given axis;
   a toothed disc secured to said wheel hub for rotation therewith, said toothed disc having an outer periphery coaxial with said given axis;
   a non-rotating fixing flange secured to one of said axle and said kingpin; and a sensor having at least one magnetic pole piece extending axially therefrom, said sensor being secured to said fixing flange to dispose said magnetic pole piece a greater distance from said given axis than the outer periphery of said toothed disc and in spaced relation to the outer periphery of said toothed disc to provide a desired air gap between the outer periphery of said toothed disc and said magnetic pole piece, said air gap having a minimum variation as said toothed disc rotates relative to said magnetic pole pieces,
   said fixing flange and said kingpin being constructed as a unitary structure.

3. A mounting arrangement for wheel speed sensors comprising:
   a wheel axle having a given longitudinal axis;
   a kingpin disposed about said axle coaxial with said given axis;
   a wheel hub disposed about said kingpin coaxial with said given axis;
   a toothed disc secured to said wheel hub for rotation therewith, said toothed disc having an outer periphery coaxial with said given axis;
   a non-rotating fixing flange secured to one of said axle and said kingpin; and
   a sensor having at least one magnetic pole piece extending axially therefrom, said sensor being secured to said fixing flange to dispose said magnetic pole piece a greater distance from said given axis than the outer periphery of said toothed disc and in spaced relation to the outer periphery of said toothed disc to provide a desired air gap between the outer periphery of said toothed disc and said magnetic pole piece, said air gap having a minimum variation as said toothed disc rotates relative to said magnetic pole pieces,
   the outer periphery of said toothed disc being spaced a first given radial distance from said given axis; and
   the outer periphery of said fixing flange being coaxial of said given axis and being spaced a second given radial distance from said given axis, said second given radial distance being greater than said first given radial distance,
   said sensor being secured to the outer periphery of said fixing flange, and
   said first and second radial distances being selected to provide said air gap.

4. An arrangement according to claim 3, wherein said sensor includes
   projections extending from both sides of said sensor,
   said projections having the same curvature as the outer periphery of said fixing flange, and
   bolts extending through apertures in said projections and threaded into mating apertures in the outer periphery of said fixing flange to secure said sensor to the outer periphery of said fixing flange.

5. An arrangement according to claim 3, wherein said sensor includes
   projections extending from both sides of said sensor, said projections having the same curvature as the outer periphery of said fixing flange, and clamping springs each having both ends thereof engaging an aperture through said fixing flange and a spring loop portion engaging one of said projections to secure said sensor to the outer periphery of said fixing flange.

6. An arrangement according to claim 3, wherein said sensor includes first projections extending from both sides of said sensor, said first projection having the same curvature as the outer periphery of said fixing flange, a second projection extending from the top of said sensor, a third projection extending from both sides of said sensor adjacent said first projection, and clamping springs each having one end thereof engaging an aperture through said fixing flange, the other end thereof engaging said second projection and a spring loop portion engaging one of said first and third projections to secure said sensor to the outer periphery of said fixing flange.

7. A mounting arrangement for wheel speed sensors comprising:

a wheel axle having a given longitudinal axis;

a kingpin disposed about said axle coaxial with said given axis;

a wheel hub disposed about said kingpin coaxial with said given axis;

a toothed disc secured to said wheel hub for rotation therewith, said toothed disc having an outer periphery coaxial with with given axis;

a non-rotating fixing flange secured to one of said axle and said kingpin;

a sensor having at least one magnetic pole piece extending axially therefrom, said sensor being secured to said fixing flange to dispose said magnetic pole piece a greater distance from said given axis than the outer periphery of said toothed disc and in spaced relation to the outer periphery of said toothed disc to provide a desired air gap between the outer periphery of said toothed disc and said magnetic pole piece, said air gap having a minimum variation as said toothed disc rotates relative to said magnetic pole pieces;

a layer of plastic material disposed on the bottom of said magnetic pole piece, the thickness of said layer of plastic material being equal to said air gap;

said magnetic pole piece extending through an aperture in the side of said fixing flange to position said layer of plastic material in abutting relation with the outer periphery of said toothed disc; and bolts to secure said sensor to the side of said fixing flange to maintain the abutting position of said layer of plastic material and the outer periphery of said toothed disc.

8. An arrangement according to claim 7, wherein the first revolution of said toothed disc scrapes said layer of plastic material off the bottom of said magnetic pole piece to provide said air gap.

* * * * *